Dec. 23, 1958 H. R. KAISER ET AL 2,865,564

HIGH-SPEED ELECTRONIC DATA CONVERSION SYSTEM

Filed April 2, 1953 4 Sheets-Sheet 1

INVENTORS.
HAROLD R. KAISER,
BY CLAUDE A. LANE,
WILFORD S. SHOCKENCY,
Seymour M. Rosenberg
ATTORNEY.

Dec. 23, 1958 H. R. KAISER ET AL 2,865,564

HIGH-SPEED ELECTRONIC DATA CONVERSION SYSTEM

Filed April 2, 1953 4 Sheets-Sheet 2

INVENTORS,
HAROLD R. KAISER,
BY CLAUDE A. LANE,
WILFORD S. SHOCKENCY,
Seymour M. Rosenberg
ATTORNEY.

INVENTORS.
HAROLD R. KAISER.
BY CLAUDE A. LANE,
WILFORD S. SHOCKENCY,
Seymour M. Rosenberg
ATTORNEY.

HIGH-SPEED ELECTRONIC DATA CONVERSION SYSTEM

Filed April 2, 1953

4 Sheets-Sheet 4

INVENTORS.
HAROLD R. KAISER,
BY CLAUDE A. LANE,
WILFORD S. SHOCKENCY,
Seymour M. Rosenberg
ATTORNEY.

United States Patent Office 2,865,564
Patented Dec. 23, 1958

2,865,564

HIGH-SPEED ELECTRONIC DATA CONVERSION SYSTEM

Harold R. Kaiser, Woodland Hills, Claude A. Lane, Culver City, and Wilford S. Shockency, Torrance, Calif., assignors, by mesne assignments, to Hughes Aircraft Company, a corporation of Delaware Application April 2, 1953, Serial No. 346,391

3 Claims. (Cl. 235—61)

This invention relates to electronic data conversion systems, and more particularly to high-speed electronic data conversion systems which may be utilized to convert a plurality of analogue signals to corresponding sets of digital signals and/or to convert a plurality of sets of digital signals to corresponding analogue signals.

Data conversion systems of the type provided by the present invention are applicable to all electrical systems which utilize both continually-varying or analogue information and discrete or digitalized information. For example, pulse code modulation systems include a data converter at the transmitter end for translating analogue voice signals into corresponding sets of digital signals, and a converter at the receiver end for translating the digital signal sets back to corresponding analogue voice signals.

Data conversion systems also find application in control systems where a digital computer is utilized to determine the position of analogue devices, such as synchros, servos, and the like. In this type of system an analogue signal is derived from each of the devices to be controlled and is converted to a corresponding set of digital signals which are used in the computer. The computer produces a digital result according to a predetermined calculation, and the digital result is converted to an analogue signal which is utilized to control the analogue device.

For simplicity, it will be assumed hereinafter that an electronic data conversion system as set forth above, includes an analogue-to-digital converter for performing the initial or input conversion and a digital-to-analogue converter for performing the final or output conversion. Thus, analogue-to-digital and digital-to-analogue conversions are referred to, respectively, as input and output conversions. It should be understood, however, that in some applications the input and output conversions may be digital-to-analogue and analogue-to-digital conversions, respectively, and that the situation herein assumed is for illustration purposes only.

The earlier electronic data converters were desired for pulse code modulation communication systems where the input and output conversions are performed at different points, and consequently separate and distinct converter sections were provided for these conversions. Thus, patents and publications relating to the earlier conversion systems generally disclose either input converters or output converters, but not combined input-output converters.

Due to the separate development of prior-art input and output converters the systems provided thereby are generally incompatible with respect to structure sharing. Thus it will be seen in the description of prior-art input converters which follows that for the most part the structure of the input converter may not be utilized in an output converter.

Four general types of electronic input converters have been utilized in the prior art. In a first type of input converter, hereinafter referred to as a "counting" converter, a sample of a voltage representing the analogue data to be converted is first introduced into a sampling pulse-width modulator which measures the amplitude of the voltage sample with respect to a reference bias voltage and gates out a pulse having a width proportional to the measured amplitude. This gate pulse controls a gate which is coupled between a clock-pulse source and a pulse counter, the control being in such a manner that the number of clock pulses passed to the counter is substantially proportional to the width of the gate pulse. The clock pulse rate is determined by the maximum number of digits to be represented. For example, if the analogue data are to be represented by four binary digits, the clock pulse rate is set so that the maximum width of the gate pulse is equal to 16 times the period of the clock pulses.

A counting converter of the general type described above is shown in U. S. Patent, Serial No. 2,272,070, entitled "Electric Signaling System" by A. H. Reeves, issued February 3, 1942; and an improvement in this type of conversion system is described and claimed in copending U. S. patent application Serial No. 293,625, entitled "Analogue-to-Digital Converter System" by M. L. MacKnight, filed June 14, 1952, now Patent No. 2,787,418.

In operation the counting converter requires $2^N$ clock pulse intervals to convert an analogue signal to an N digit binary number. This conversion time is required regardless of the analogue signal to be converted. Where the counter used in the counting type of input converter is also to be used for output conversion, $2^{N+1}$ clock pulse intervals are required to complete the input-output conversion of each analogue signal. The reason for this is that in addition to the $2^N$ pulse intervals required for the input conversion, the counter is operated through a second cycling period of $2^N$ clock pulse intervals for the output conversion.

A second type of electronic input converter known in the prior art may be referred to as a "digit-at-a-time" converter, since the analogue signal is converted to a set of digital signals, one binary digit at a time. One system of this general type is described in an article entitled "Telephony by Pulse Code Modulation" by W. M. Goodall in vol. XXVI of Bell System Technical Journal, January 1948, on pages 395–409.

In the sytem described in the article by W. M. Goodall, the amplitude of the analogue sample is compared with a standard voltage representing the magnitude of the highest order digit of the digital set. If the standard voltage is smaller than the sample, it is subtracted from the sample and the remainder is then compared with a standard voltage representing the next highest order digit. This process is continued until the lowest order or units digit is compared with the remainder of the sample and is determined to be either larger or smaller. Each time the standard voltage is found to be smaller than the sample, a binary 1 is recorded or transmitted; and each time the standard voltage is found to be larger than the sample, a binary 0 is recorded and the standard voltage is not subtracted from the sample.

In operation the digit-at-a-time converter requires only N clock pulse time intervals for each conversion and, consequently, has the advantage of speed over the counting type of converter. The particular type of digit-at-a-time converter described in the above-cited publication, however, has the disadvantage of greater circuit complexity and the fact that it may not readily be combined with an output converter without the introduction of a considerable amount of additional circuits.

In a third type of input converter, hereinafter termed a "continuous" converter, the amplitude of the analogue signal to be sampled is continuously compared with a variable reference voltage representing the digital count in a counter. After each comparison, a signal is produced indicating the difference between the analogue potential and the reference voltage; the signal being then utilized to vary the count of a counter, and thereby the reference voltage, in single discrete steps until the magnitude of the reference voltage and the analogue signal are substantially equal. Once this condition is reached the counter continuously follows the variations of the analogue potential, and readings are available after extremely short time intervals. A continuous converter of this general type is described in U. S. patent, Serial No. 2,539,623, entitled "Communication System" by R. A. Heising, issued January 30, 1951; and an improved type of continuous converter is described and claimed in a copending U. S. patent application, Serial No. 272,784 entitled "Analog-to-Digital Converter" by Cameron B. Forrest and Sidney S. Green, filed February 21, 1952.

Whenever it is possible to sample the analogue signal continuously, it is apparent that the continuous type of converter provides a very high-speed conversion system. In addition, that section of the converter which provides a reference voltage representing the digital count in the counter may readily be used in an output converter, without the introduction of a substantial amount of additional circuits. The continuous type of converter, however, cannot operate at high speed in a system where it is necessary to convert a plurality of analogue signals to corresponding digital signal sets, and where there is no previous digital record of the conversion of the analogue signals. Since in its fastest operation the counter would be set at half scale and count up or down, depending upon whether or not the analogue signal was greater or less than the reference voltage, it is clear that the continuous converter requires at least $2^{N-1}$ clock pulse intervals for each conversion in a multiple analogue signal system.

Finally, a fourth type of analogue-to-digital converter measures the amplitude of the analogue sample and produces the corresponding digit pulses directly without intermediate counting or substracting. This type of converter may be referred to as a "direct" converter, one such converter being shown in U. S. patent, Serial No. 2,530,538, entitled "Vernier Pulse Code Communication System" by A. J. Rack, issued November 21, 1950. The converter described in the patent to Rack includes a cathode ray tube provided with deflecting elements for deflecting the beam, under control of an analogue signal sample to be coded, to a particular aperture row. The aperture rows are arranged in accordance with the digital code which is representative of the analogue signal sample. This type of converter provides the highest speed of operation but requires special structure and is not adaptable for use in a combined analogue-to-digital and digital-to-analogue conversion system where common structure is used for both conversions.

The present invention provides a high-speed data conversion system which may be utilized for input and output conversions where there is no previous digital record of the conversion of the analogue signal. The input conversion may be considered to be of the digit-at-a-time conversion type described above, in that one binary digit is formulated at a time, the entire conversion requiring N clock pulse intervals.

Input conversion, according to the present invention, however, is not performed in the manner described in the above-cited article by W. M. Goodall, since separate standard voltages are not generated for each of the digits to be represented. According to the present invention the digital number stored in a register having as many flip-flops therein as the number of binary digits desired is continuously converted into a corresponding reference potential signal. The reference signal is compared with the analogue sample in a comparator which produces a signal indicating the sense of the difference between the reference signal and the analogue sample.

At the start of the conversion the register flip-flop storing the highest place binary digit is set to 1 and all other flip-flops are set to 0; consequently, the reference signal has a magnitude corresponding to the highest order digit to be represented. The signal produced by the comparator then indicates whether or not the analogue sample is larger than the reference signal. If the analogue sample is larger than the reference signal, the highest place digit should be 1 and the setting of the highest place flip-flop is not changed. Otherwise, the highest place flip-flop is set to 0. The lower-place flip-flops are then turned on, one at a time in descending order, each flip-flop being set in accordance with the sense of the difference resulting from the corresponding comparison.

The register, reference signal providing circuits, and comparator are also used for the output conversion, where the digital information to be converted is initially entered into the register.

During the output conversion the comparator functions to control the charging or discharging of a capacitor which is to store a voltage representative of the analogue equivalent of the digital information which has been entered into the register. The voltage developed across the capacitor is continuously compared with the reference signal corresponding to the register setting. Whenever the voltage developed across the capacitor is lower than the reference signal, the capacitor is charged; and whenever the capacitor voltage is greater than the reference voltage, the capacitor is discharged. After the conversion is completed, the capacitor charging and discharging circuits are effectively removed and the capacitor serves as an analogue memory. The voltage which is developed across the capacitor during the conversion period is always stabilized to a value which is equal to the conversion of the binary number in the register within an error range which is smaller than the analogue representation of the least significant binary digit.

Since the capacitor charging circuits are simple, it is apparent that the present invention provides an input-output conversion device which uses a minimum of additional circuits for providing a combination of conversions. The present invention thus achieves the high-speed characteristic of the digit-at-a-time type of converter, without sacrificing circuit simplicity, in order to obtain a complete input-output conversion system.

The high-speed characteristic of the conversion system of the present invention makes it practical to handle a great number of input-output conversions on a time-sharing basis. The analogue signals to be converted, and the capacitor voltage signals which are to be developed into output analogue signals, are applied to the comparator circuit through separate electronic input switches which may be operated at high-speed without distorting the input signals. A number of electronic output switches are provided in order to apply the controlling comparator output signal to the corresponding capacitor charging circuit during the output conversions.

The principal embodiment of the present invention comprises: a digital number register having N flip-flops which are turned on one at a time during the input conversion, the same flip-flops being utilized to store the digits of a digital number during an output conversion; a digital-to-analogue decoding circuit for continuously producing a reference signal corresponding to the digital information in the register; a comparator circuit responsive to the reference signal and an applied analogue signal for producing an output signal indicating the sense of the difference between the reference signal and the analogue signal; a plurality of input switches for selectively applying input or output analogue signals to the input circuit of the comparator; a plurality of analogue output circuits, controlled by the comparator signal, for charging a corresponding plurality of capacitors, one for each output circuit, to produce output voltages corresponding to the analogue representation of the digital number in the register; and a control circuit for sequencing the input and output conversions according to a pre-determined time-sharing basis, for controlling the turning on and off of the register flip-flop in response to the flip-flop signals and to the comparator signal, and for actuating the analogue output circuits to produce the output signal in response to the comparator output signal.

Accordingly, it is an object of the present invention to provide a data conversion system which is adapted to accommodate both analogue-to-digital and digital-to-analogue conversions without necessitating a substantially greater amount of circuits than is required for analogue-to-digital conversion alone.

Another object is to provide a high-speed electronic data conversion system which may be utilized to convert an analogue input signal to an N-digit binary number without a previous digital record, the conversion being completed in N clock pulse intervals.

An additional object is to provide an input-output conversion system which may be utilized for converting a plurality of analogue and digital signals to corresponding digital and analogue signals, respectively, the conversion being performed on a time-sharing basis, without the necessity of additional conversion circuits.

A further object of the present invention is to provide a digit-at-a-time type of converter system, wherein substantially all of the structure which is used in the analogue-to-digital conversion may also be used in the digital-to-analogue conversion.

Still another object is to provide a data conversion system, wherein the analogue-to-digital conversion is performed by setting the stages of a digital number register, one at a time, under the control of a comparator circuit which produces an output signal corresponding to the difference between the analogue representation of the register setting and the analogue signal to be converted; and wherein the digital-to-analogue conversion is performed by utilizing the register to store the digital number to be converted, the comparator then being utilized to control the development of an analogue signal which is compared with the analogue representation of the register setting.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Figure 1:
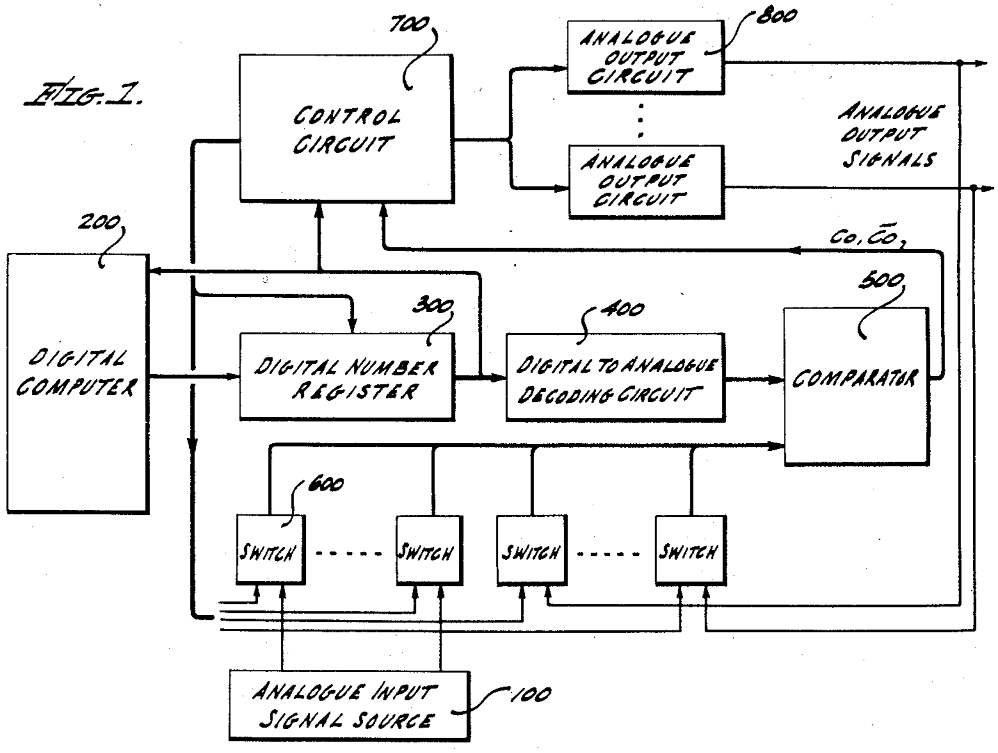
Fig. 1 is a block diagram of the basic embodiment of the present invention.

Referring now to Fig. 1, there is shown one embodiment of a data conversion system according to the present invention, wherein analogue input signals produced by a source 100 may be converted to equivalent digital signals which are applied to a digital computer 200, and wherein the output signals of digital computer 200 may be converted to equivalent analogue output signals. Although the data conversion system of Fig. 1 is an integral system, it may be considered as including two basic elements having common components. These basic elements are an input converter for performing analogue-to-digital or input conversions, and an output converter for performing digital-to-analogue or output conversions.

The input converter of the data conversion system shown in Fig. 1 comprises: a digital number register 300; a decoding circuit 400, connected to register 300, for producing a reference signal corresponding to the digital setting of register 300; a comparator circuit 500, responsive to the reference signal and to an analogue input signal applied through one of separate input switches 600, for producing *a* signals $Co$ and $\overline{Co}$ indicating the sense of the difference between the reference signal and the analogue input signal; and a control circuit 700, responsive to digital signals produced by register 300 and signals $Co$ and $\overline{Co}$, for producing control signals to actuate register 300 so that it is set one digit at a time during the input conversion. Control circuit 700 also produces timing signals for sequencing the switching in of analogue input signals.

The output converter of the embodiment shown in Fig. 1 utilizes register 300, decoding circuit 400, and comparator 500; and further includes additional input switches 600 and analogue output circuits 800. Each digital number to be converted to an analogue signal is entered into register 300 from computer 200 and decoding circuit 400 then produces a reference signal corresponding thereto. The reference signal produced by decoding circuit 400 is applied to comparator 500 which produces complementary signals $Co$ and $\bar{C}o$ indicating the sense of the difference between the reference signal and the analogue output signal of the particular output circuit which is to be controlled. Control circuit 700 then responds to signals $Co$ and $\bar{C}o$ produced by comparator 500 and actuates the corresponding analogue output circuit so that the analogue output signal is changed until it becomes equal to the signal produced by decoding circuit 400.

Many of the circuits which are utilized in the embodiment shown in Fig. 1 are mechanized according to logical equations, these equations being determined through a logical consideration of the manner in which the conversion is to be performed. Consequently, the invention is more readily understood by first considering the manner in which the conversion is to be performed, then deriving the defining logical equations, and finally considering the details of specific circuits. The logical equations are considered only briefly and only one form is shown, reference for further details and other types of logical circuits being made to copending U. S. patent application, Serial No. 346,392, entitled "High-Speed Electronic Analogue-to-Digital Converter System" by H. R. Kaiser, C. A. Lane, and W. S. Shockency, filed April 2, 1953, now Patent No. 2,784,396.

Figure 2:
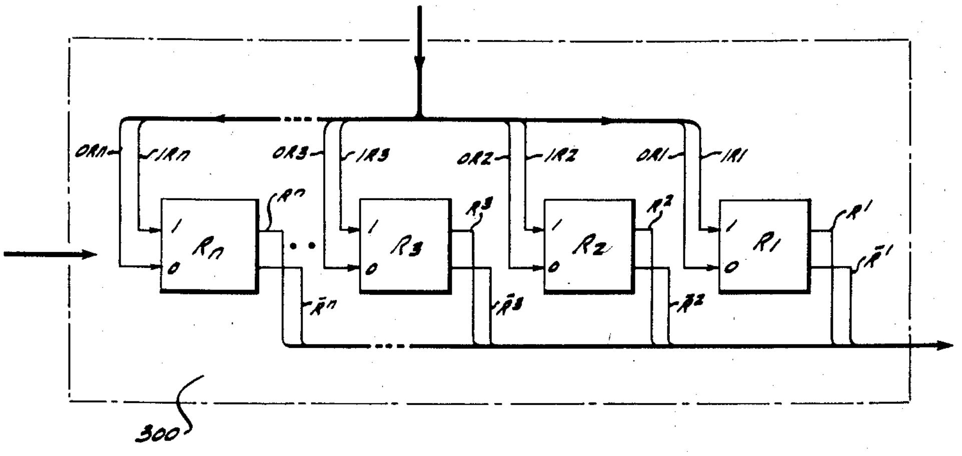
Fig. 2 is a block diagram of one form of the digital number register shown in Fig. 1.

In the analysis which follows it will be assumed that register 300 produces *n* pairs of complementary digital signals representing the *n* digits of the number desired, and designated as $R^1$, $\bar{R}^1$; $R^2$, $\bar{R}^2$; $R^3$, $\bar{R}^3$; . . . and $R^n$, $\bar{R}^n$, respectively. One form of register suitable for providing the digital signals is illustrated in Fig. 2 wherein it is noted that register 300 includes *n* flip-flops R1, R2, R3, . . . and **R*n*, producing complementary output signals $R^1$, $\bar{R}^1$; $R^2$, $\bar{R}^2$; $R^3$, $\bar{R}^3$; and $R^n$, $\bar{R}^n$; respectively, and having 1 and 0 input circuits designated as 1R1, 0R1; 1R2, 0R2; 1R3, 0R3; . . . and 1R*n*, 0R*n***, respectively. The input circuits of each flip-flops are arranged so that separate application of signals to the 1 and 0 input circuits set the flip-flop to stable states representing binary 1 and 0, respectively; and simultaneous application of signals to both input circuits, triggers, or reverses the stable state of the flip-flop.

It will be noted that the leads shown in Fig. 2 are designated by the signals appearing thereon, as illustrated by lead $R^n$ which receives output signals $R^n$ from flip-flop R*n*. This convention is followed throughout this specification so that the algebraic mechanization equations which are given below may be interpreted directly as the circuit connections which are shown in the figures. In addition, it will be noted that the leads coming from control circuit 700 are numbered according to the flip-flop input circuit to which they are connected. Thus, lead 1R3 is connected to input circuit 1R3 of flip-flop R3. Specific connections are not shown between computer 200 and register 300 since such connections depend upon the manner of signal entry desired. For example, in some operations it may be convenient to shift digital numbers into register 300 serially; the flip-flops of the register 300 being connected into a shifting register chain in a manner well known in the art. In other operations it may be convenient to enter digit signals into the register flip-flops in parallel, the signals in this case being applied directly to the corresponding flip-flops.

The input conversion is initiated by setting flip-flop R*n* to 1 and flip-flops R1 through R*n*−1 to 0. While this may be done by a reset pulse, it is assumed hereinafter that it is performed in response to a voltage-level timing signal T*i* and the application of a synchronizing or clock pulse signal C*p*. After flip-flop R*n* is turned on, or set to 1, signal C*o* of comparator 500 assumes a level of binary 1 if the reference signal becomes larger than the analogue input signal, or assumes a level of 0 if the reference signal is smaller than the analogue input signal. If signal C*o* is equal to 1 flip-flop R*n* must be reset to 0 since its binary weight is not included in the conversion of the analogue input signal. On the other hand, if signal C*o* is 0, flip-flop R*n* is not reset to 0 and remains at 1, indicating that the most significant digit of the conversion is 1.

The input conversion operation, then, is continued in the same manner, each flip-flop R*j* being turned on after the preceding flip-flop R*j*+1 has been set to 1; the letter *j* being used to designate any of the flip-flops R1 through R*n*−1. In order to insure that each flip-flop is turned on only once during an input conversion period it is necessary to include the restriction that each flip-flop R*j* is turned on only when all of the lower place flip-flops R1 through R*j*−1 remain in a 0 state.

After each flip-flop R*j* is set to 1, it is reset to 0 if signal C*o* is 1, otherwise it remains in the 1 state. It is also necessary to include the restriction that all of the lower place flip-flops R1 through R*j*−1 remain set to 0 so that each flip-flop is set only once, according to signal C*o*, during the input conversion period.

The circuit connections, then, which are necessary in order to control the setting of the flip-flops of register 300, in the above described manner, may be expressed algebraically as follows:

$$1Rn=Ti.Cp$$
$$0Rn=Ad.(\bar{R}^{n-1}\ \ldots\ \bar{R}^{1}).Co.Cp$$

.

.

.

$$1Rj=Ad.(R^{j+1}.\bar{R}^{j-1}\ \ldots\ \bar{R}^{1}).Cp$$
$$0Rj=Ad.(\bar{R}^{j-1}\ \ldots\ \bar{R}^{1}).Co.Cp+Ti.Cp$$

.

.

.

$$1R1=Ad.R^{2}.Cp$$
$$0R1=Ad.Co.Cp+Ti.Cp$$

where signal A*d* is one having a level representing binary 1 during the analogue-to-digital conversion period. In these functions the dot (.) represents the logical "and." Thus, the expression: $1Rn=Ti.Cp$, indicates that a signal is applied to the 1 input circuit of flip-flop R*n* when the timing signal T*i* is equal to 1 "and" a clock pulse is applied. The plus (+) sign indicates a logical "or" relationship, so that if either or both of the conditions in the function are satisfied, a signal is applied to the corresponding flip-flop. Thus, the expression:

$$0R1=Ad.Co.Cp+Ti.Cp$$

is satisfied if either $$Ad.Co.Cp=1$$

or $$Ti.Cp=1$$

or both are equal to 1.

It will be noted that flip-flop R*n* is turned to 1 at the beginning of the operation by $Ti.Cp=1$, and that it is turned to 0 during the analogue-to-digital conversion period ($Ad=1$), if C*o* is equal to 1 and each of the lower place flip-flops registers 0, as indicated by the condition $\overline{Rn-1}\ \ldots\ \overline{R1}=1$; and that the other flip-flops R*j* are turned to 1 during the analogue-to-digital conversion period, one clock pulse period after the higher place flip-flop has been set to 1, as signalled by $Rj+1=1$, providing that all of the lower place flip-flop register 0 as indicated by $\bar{R}^{j-1}\ \ldots\ \bar{R}^{1}=1$. Flip-flop R*j*, then, is set to 0, if C*o* is equal to 1 and all of the lower place flip-flops are set to 0, or is left set to 1 if C*o* is equal to 0.

Figure 3:
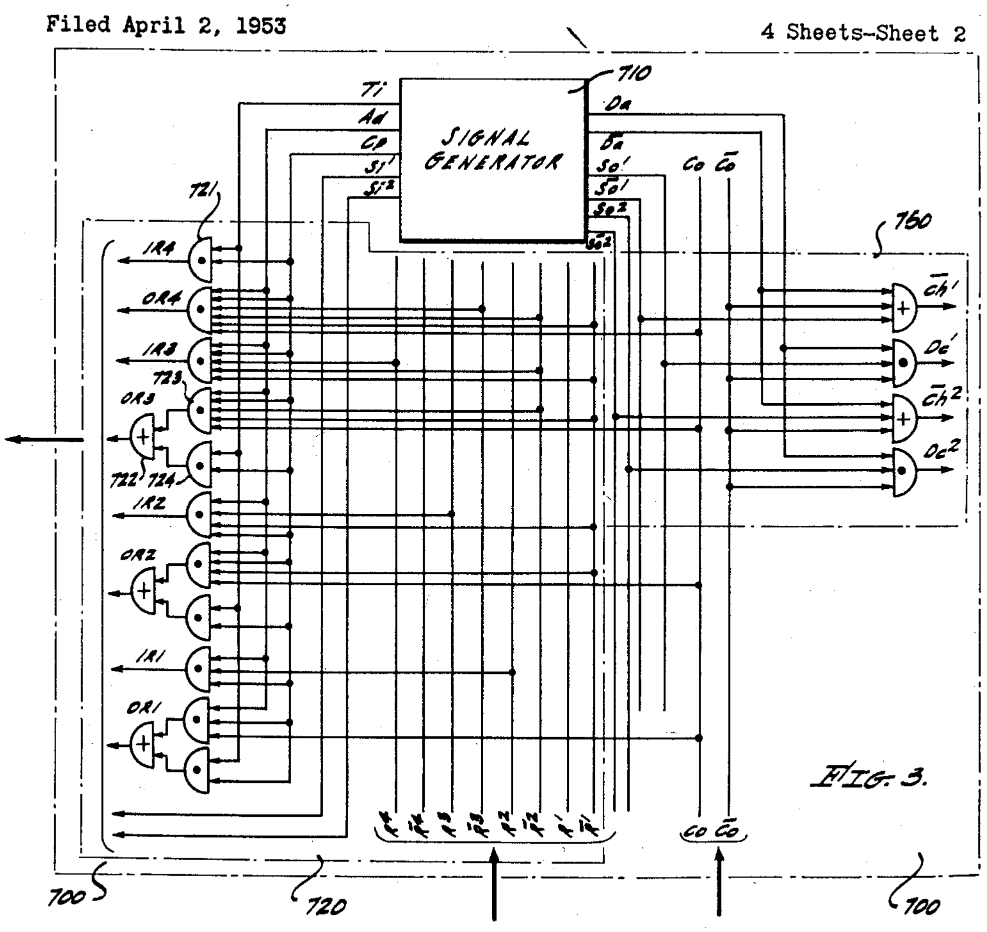
Fig. 3 is a schematic diagram of one form of the control circuit shown in Fig. 1.
Figures 6, 7:
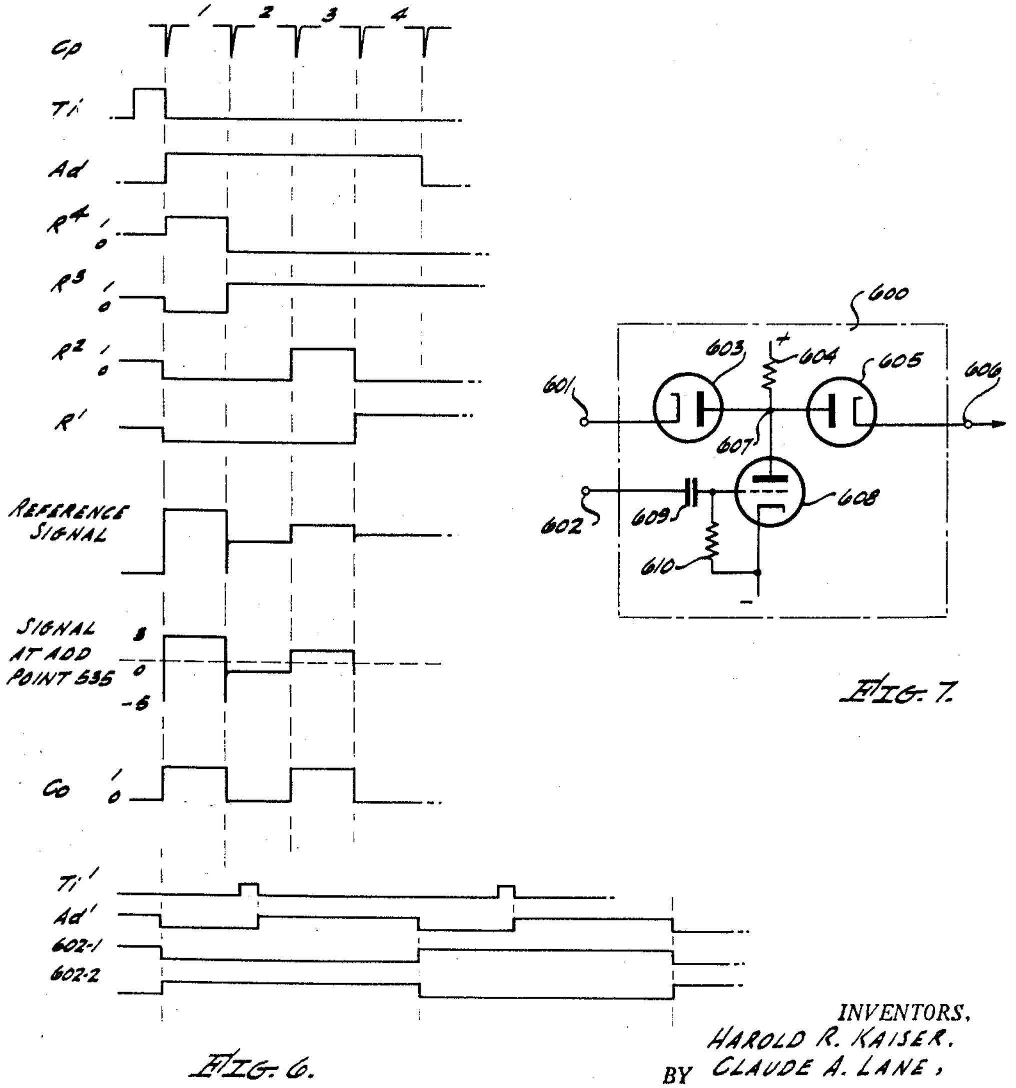
Fig. 6 is a composite diagram of the wave forms of signals appearing at various points in the embodiment of Fig. 1 during illustrative analogue-to-digital conversion.
Fig. 7 is a schematic diagram of one form of the input switch shown in Fig. 1.

The manner in which specific circuits are mechanized according to the defining algebraic functions given above is illustrated in Fig. 3 which shows one form of control circuit 700 of Fig. 1. Referring now to Fig. 3, it is noted that signals A*d*, T*i*, and C*p* are produced by a signal generator 710. The waveforms of signals C*p*, A*d*, and T*i* are illustrated in Fig. 6, where the other waveforms shown are those which occur during a particular input conversion operation which is described in detail blow. Signal generator 710 is not shown in detail, since such circuits are well known in the art.

Control circuit 700 also includes a control matrix 720 which provides the input signals controlling the register flip-flops. It will be noted that for purposes of simplicity, input signals for only four flip-flops, R1, R2, R3, and R4, are shown in Fig. 3, although any number of flip-flop input signals may be provided in the same manner. The defining algebraic equations for matrix 720 are:

$$1R4=Ti.Cp$$
$$0R4=Ad.\bar{R}^{3}.\bar{R}^{2}.\bar{R}^{1}.Co.Cp$$
$$1R3=Ad.R4.\bar{R}^{2}.\bar{R}^{1}.Cp$$
$$0R3=Ad.\bar{R}^{2}.\bar{R}^{1}.Co.Cp+Ti.Cp$$
$$1R2=Ad.R^{3}.\bar{R}^{1}.Cp$$
$$0R2=Ad.\bar{R}^{1}.Co.Cp+Ti.Cp$$
$$1R1=Ad.R^{2}.Cp$$
$$0R1=Ad.Co.Cp+Ti.Cp$$

Each of "and" functions in these equations is provided by an "and" circuit, such as "and" circuit 721, providing the signal T*i*.C*p*, applied to flip-flop input circuit 1R4. Circuit 721 responds to signals T*i* and C*p* applied to separate input terminals and produces the signal T*i*.C*p* when signal T*i* is at a high-level representing binary 1, and a clock pulse is applied. Each of the 'or' functions is provided by an "or" circuit, such as "or" circuit 722 which provides a signal for input circuit 0R3. "Or" circuit 722 has two input terminals, one being connected to "and" circuit 723, producing an output signal $Ad.\overline{R2}.\overline{R1}.Co.Cp$, and the other being connected to "and" circuit 724, producing output signal T*i*.C*p*. "And" circuit 723 has signals A*d*, $\overline{R2}$, $\overline{R1}$, C*o*, and C*p* applied to separate input terminals and "and" circuit 724 has signals $T_i$ and $C_p$ applied to separate input terminals. The manner in which the other "and" and "or" circuits are mechanized, according to the corresponding equations, should be apparent from the examples already considered.

Figure 4:
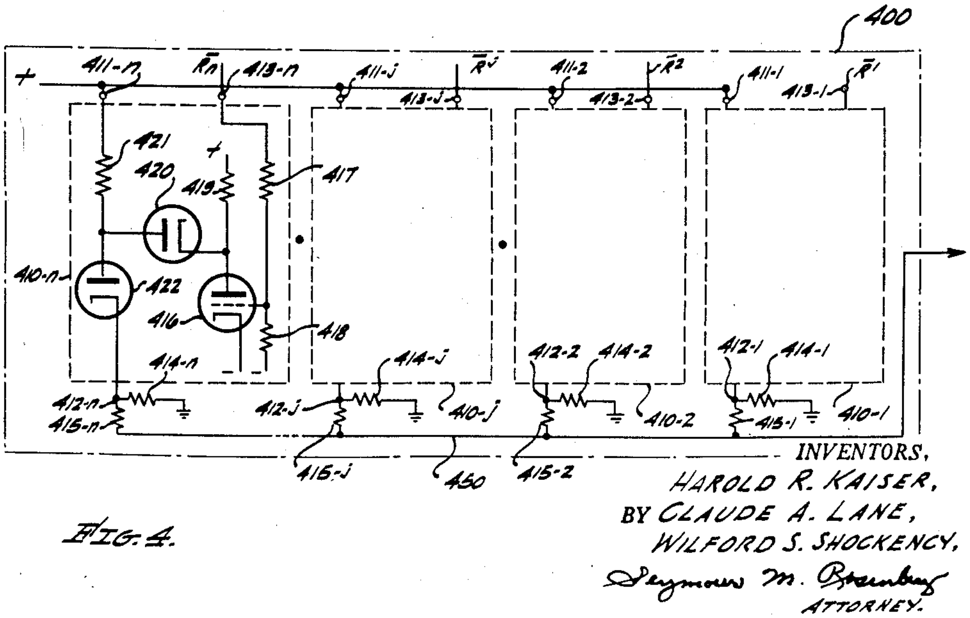
Fig. 4 is a schematic diagram of one form of the digital-to-analogue decoding circuit shown in Fig. 1.

During the time that the flip-flops of register 300 are being turned on or off under the control of signals produced by control circuit 700, decoding circuit 400 continuously produces an output signal indicating the setting of register 300. Decoding circuit 400 may be any of the well-known types of circuits for providing an analogue signal representation of a digital number. A suitable decoding circuit for example, is described and claimed in copending U. S. patent application, Serial No. 239,077, entitled "Digital-to-Analog Converter" by Siegfried Hansen, Filed July 28, 1951, now Patent No. 2,718,634. It is preferred, however to use a decoding circuit of the type shown in Fig. 4 of this specification. The description in this specification concerning the decoding circuit of Fig. 4 is brief, since the circuit is described in greater detail in copending U. S. patent application, Serial No. 346,393, now Patent No. 2,736,889, entitled, "High-Speed Electronic Digital-to-Analogue Converter System, wherein another species of this type of decoding circuit is also described.

As shown in Fig. 4, decoding circuit 400 comprises a plurality of current switches 410; $n$ switches being shown corresponding to the $n$ flip-flops in register 300, respectively. Each of the current switches 410–$j$ ($j$ being any of the integers 1 through $n$) has an input terminal 411–$j$, an output terminal 412–$j$, and a control terminal 413–$j$. A source of positive potential, not shown, is applied to input terminal 411–$j$ and output terminal 412–$j$ is coupled to ground through a first current-weighting resistor 414–$j$. Signal $\bar{R}^j$, produced by flip-flop $R_j$, is applied to control terminal 413–$j$ and is effective to control the switch in a manner to be described. Output terminal 412–$j$ is also coupled through a second current-weighting resistor 415–$j$ to common output line 450, which is connected to the input circuit of comparator 500, described in detail below.

Each of current switches 410–$j$ is "open" when the signal $\bar{R}^j$ applied to control terminal 413–$j$ is at a high level, indicating that the corresponding flip-flop registers a 0, and is "closed" when signal $\bar{R}^j$ is at a low level, indicating that the corresponding flip-flop registers a 1. When $\bar{R}^j=1$, and current switch 410–$j$ is open, no current passes through either of current-weighting resistors 414–$j$ or 415–$j$; whereas when signal $\bar{R}^j=0$, current switch 410–$j$ is closed and current flows through resistors 414–$j$ and 415–$j$.

Resistors 414–$j$ and 415–$j$ are selected so that when the input conversion is completed the current through resistor 415–$j$ has a value corresponding to the binary weight of the digit stored in flip-flop $R_j$. As will be more fully understood when comparator 500 is considered in detail, the voltage on output line 450 is 0 volts at the end of the input conversion period and consequently the values of resistors 414–$j$ and 415–$j$ are readily computed on the basis of a given source voltage and current switch impedance. Complete details as to circuit values and potentials are given in the above-mentioned copending application for "High-Speed Electronic Digital-to-Analogue Converter System."

In one form, each of current switches 410 may be of the type illustrated for current switch 410–$n$. As shown in Figure 4, current switch 410–$n$ comprises a triode 416 having its control grid connected through a resistor 417 to control terminal 413–$n$ and connected through a resistor 418 to a source of negative biasing potential, not shown. The biasing potential is selected so that with signal $\bar{R}^n$ in its high-level state representing binary 1 triode 416 conducts, and with signal $\bar{R}^n$ in its low level state triode 416 is cut off.

The anode of triode 416 is coupled through a load resistor 419 to a source of positive potential, not shown, and to the cathode of a diode 420. The anode of diode 420 is coupled through a resistor 421 to input terminal 411–$n$. The cathode of triode 416 is connected to a source of negative potential, not shown, which is selected so that conduction of triode 416 lowers the potential appearing at the anode of diode 420 to a negative value. The anode of diode 420 is also connected to the anode of a second diode 422 which has its cathode connected to output terminal 412–$n$.

In operation, whenever signal $\bar{R}^n$ is high and triode 416 is conducting the potential appearing at the anode of diodes 420 and 422 is sufficiently negative to bias diode 422 so that no current may pass therethrough. Thus, the current switch is "open" when signal $\bar{R}^n$ represents binary 1, and flip-flop $R_n$ registers 0.

When signal $\bar{R}^n$ is at a low level indicating that flip-flop $R_n$ registers a 1, triode 416 is cut off, with the result that the anode potential thereof rises to a level which is high enough to bias off diode 420. As a result, diode 422 is no longer biased off and conducts, allowing a binary-weighted current to flow through resistor 415–$n$, which constitutes closure of the switch.

Figure 5:
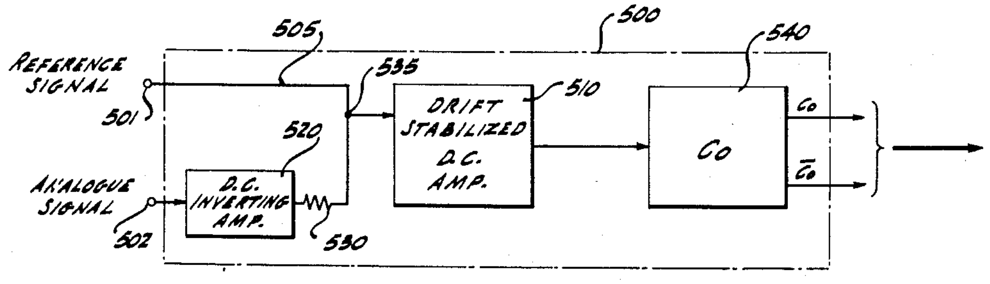
Fig. 5 is a schematic diagram of one form of the comparator shown in Fig. 1.

Since a binary-weighted current passes through each current switch 410–$j$ when it is closed under the control of the associated flip-flop signal $\bar{R}^j=0$, it is apparent that the total current passing through all of the current-weighting resistors 415 corresponds to the binary setting of resistor 300. The currents passing through resistors 415 are added in output lead 450 which is connected to the input circuit of comparator 500, one embodiment of which is shown in Fig. 5. It should be apparent now that the current signal which is present in lead 450 is the reference signal above referred to.

Consider now the manner in which comparator 500, shown in Fig. 5, produces signals $C_o$ and $\bar{C}_o$ as a function of the sense of the difference between the reference signal an an applied analogue input signal. Referring now to Fig. 5, it is noted that the reference signal and the analogue signal to be converted are applied to first and second input terminals 501 and 502 of comparator circuit 500. Input terminal 501 is connected via lead 505 to the input circuit of a drift-stabilized D. C. amplifier circuit 510, and input terminal 502 is connected to the input circuit of D. C. inverting amplifier 520, amplifier 520 being also drift stabilized and producing an amplified output signal which corresponds to the applied analogue input signal but having an opposite polarity or sign. The output circuit of amplifier 520 is coupled through an adding resistor 530 to lead 505, the junction 535 created thereby being hereinafter referred to as an add point.

Amplifier 510 produces a signal which corresponds to the difference between the reference signal and the analogue signal, the difference signal being then applied to the input circuit of a D. C. trigger circuit 540. Trigger circuit 540 has first and second output circuits producing signals $C_o$ and $\bar{C}_o$, respectively. Signals $C_o$ and $\bar{C}_o$ have levels representing binary 1 and 0, when the sense of the difference between the reference signal and the applied analogue input signal is positive, and have levels representing binary 0 and 1 when the sense of the difference is negative.

D. C. amplifier circuits suitable for use in comparator 500 are well known in the art; illustrative types of circuits, for example, being shown and described in an article entitled "Driftless D. C. Amplifier" by Frank R. Bradley et al. in vol. 25 of Electronics, April 1952, on pages 144 through 148. Similarly, D. C. trigger circuits of the type required for trigger circuit 540 are well known, a suitable circuit, for example, being known as Schmitt trigger circuit. Such a circuit is described in an article entitled "A Thermionic Trigger" by O. H. Schmitt in volumn XV of Journal of Scientific Instruments, 1938, on pages 24 through 26.

Adding resistor 530 in comparator circuit 500 is selected so that the analogue input signal at its full-scale value and register 300 set so that all flip-flops are in a 1-representing condition, the current therethrough is sufficient to cause the potential of add point 535 to stabilize at substantially zero volts. Thus, if a full-scale analogue signal causes the output voltage of amplifier 520 to fall to a potential of −50 volts, and if the sum of all currents through resistors 415 in decoding circuit 400 is 2 milliamperes, then adding resistor 530 is 25,000 ohms.

With a linear variation of the output voltage of amplifier 520 in response to a change in the analogue input signal, it is apparent that the add point potential will stabilize at substantially zero volts whenever the setting of register 300 represents the digital equivalent of the analogue input signal. The potential at the add point, however, may differ from zero by an amount which is equivalent to the analogue representation of the least significant binary digit, without reducing the accuracy of the system.

It should be understood, then, that with a decoding circuit of the type shown in Fig. 4, the potential appearing at add point 535 is positive, when the setting of register 300 represents an analogue signal greater than the analogue input signal, and that the add point potential is negative, when the setting of register 300 represents an analogue signal which is less than the analogue input signal. As is more fully explained in the above-mentioned copending application entitled, "High-Speed Electronic Digital-to-Analogue Converter System," however, decoding circuit 400 may produce negative currents corresponding to the setting of register 300 and, when this type of decoding circuit is utilized, the voltage at add point 535 is inverted with respect to that just described. In the discussion that follows, however, it will be assumed that positive and negative potentials appearing at add point 535 indicate that the reference signal is greater and less than the analogue input signal, respectively.

Trigger circuit 540 is biased so that it remains in a 0-representing state until the amplified difference signal produced by amplifier 510 rises above a positive level corresponding to the analogue equivalent of one-half of the least significant binary digit. As is more fully explained in the above-mentioned copending application for "High-Speed Electronic Analogue-to-Digital Converter System," biasing in this manner makes it possible to achieve an N-digit accuracy or, in terms of analogue measurement, an accuracy to within $1/2^N$ units, where $2^N$ units correspond to the full-scale analogue signal. It should be understood, therefore, that when it is said that signals $Co$ and $\bar{C}o$ correspond to the sense of the difference between the reference signal and the analogue input signal, what is meant is that $Co$ is 1 when the sense of the difference is positive by an amount greater than the one-half digit bias and is 0 when the sense of the difference is negative or less than the one-half digit bias.

Consider now an illustrative operation of the input conversion circuits of Fig. 1, reference being also made to Fig. 6 wherein certain waveforms occurring during this operation are shown. For simplicity it is assumed that the analogue input signal is to be converted to a four digit binary number and, consequently, register 300 includes only four flip-flops R1, R2, R3, and R4, the output signals of these flip-flops being represented, in Fig. 6, by waveforms R1, R2, R3 and R4, respectively.

In the particular operation which is to be illustrated the analogue input signal is assumed to be a 5-unit signal, where each unit is the analogue equivalent of the least significant binary digit in the digital number desired.

As shown in Fig. 6, flip-flop R4 is set to 1 and flip-flop R1 through R3 to 0 at the occurrence of the first clock pulse signal $Cp$ after signal $Ti$ assumes a 1-representing level. It will be noted that prior to the start of the input-conversion operation signals $R^1$, $R^2$, $R^3$, and $R^4$ are shown as having levels intermediate to 1 and 0 in order to indicate that may be in either state depending upon how they are left after the end of the preceding operation. It should be understood, however, that there is actually no intermediate level.

As flip-flop $R^4$ is set to 1 the reference signal produced by decoding circuit 400 assumes an 8-unit level corresponding to the analogue representation of the most significant binary digit. Since the analogue input signal is only a 5-unit signal, the difference signal at add point 535 is approximately a positive 3-unit signal (approximate since the reference signal does not accurately represent the register setting until the add point potential is 0 volts). The positive potential at add point 535 causes trigger circuit 540 to register binary 1, and consequently the comparator output signal $Co$ assumes a level of 1.

At the end of the first clock pulse period of operation, flip-flop R4 is set to 0 in response to the application of the second clock pulse signal to the gate which provides a signal for input circuit 0R4, since signal $Co$ is 1 while flip-flop R3 is set to 1 in response to the application of the same second clock pulse signal to the gate which provides an input signal for input circuit 1R3. Because the R4 flip-flop requires a finite time to change state, the $R^4$ signal is, of course, still being fed to the 1R3 gate at the time the second clock pulse is applied to the 1R3 gate. Signal $Co$ then becomes 0 since the add point potential becomes negative, representing the difference between an analogue input signal of 5 units and the 4-unit weight of flip-flop R3.

Flip-flop R3 is not turned to 0 at the end of the corresponding clock-pulse period since at this time signal $Co$ is 0 and a pulse is not applied to input circuit 0R3. Flip-flop R3, then, remains set at 1, indicating that third digit of the binary conversion is 1.

Flip-flop R2 is turned on at the beginning of the third clock-pulse period of the input conversion and is turned off at the end thereof, since the add point signal goes positive and signal $Co$ becomes 1. Finally, during the fourth period of the input conversion, the add point potential is substantially 0 volts and trigger 540 remains set in a 0-representing stable state. Thus, flip-flop R1 is set to 1, but is not set to 0 at the end of the fourth clock-pulse period. At the end of the input conversion, then, it is apparent that register 300 is set so that it represents the binary number 0101, which corresponds to the 5-unit analogue input signal. It will also be noted that signal $Co$, produced during the input conversion, is the complement of the setting of register 300 so that signal $\bar{C}o$ may be utilized to provide a serial signal corresponding to the conversion of an applied analogue input signal.

Where a plurality of analogue input signals are to be converted to corresponding sets of digital signals, each analogue signal is coupled to the input circuit of comparator 500 through a separate input switch 600; input switches 600 being opened and closed under the control of signals produced by control circuit 700. One type of circuit suitable for use in input switches 600 is illustrated in Fig. 7.

Referring now to Fig. 7, it is noted that input switch 600 includes first and second input terminals 601 and 602; the analogue signal to be converted and a control signal produced by control circuit 700 being applied to input terminals 601 and 602, respectively. Input terminal 601 is connected to the cathode of a first diode 603 having its anode coupled through a load resistor 604 to a source of positive potential, not shown; the potential applied to resistor 604 being greater than the full-scale level of the analogue input signal. The anode of diode 603 is also connected to the anode of a second diode 605 which has its cathode connected to an output terminal 606; output terminal 606 being connected to the input circuit of comparator 500. The junction 607 of diode 603 and 605 is connected to the anode of a triode 608 having its grid coupled through coupling capacitor 609 to input terminal 602, the grid of triode 608 being also coupled through a load resistor 610 to its cathode. The cathode of triode 608 is connected to a source of negative potential, not shown.

In operation, triode 608 is normally conducting so that junction 607 is held at a negative potential which biases diode 603 and 605 so that they are nonconducting and, in effect, switch 600 is "open." When a negative signal is applied to input terminal 602, triode 608 is cut off, diode 603 becomes forward biased, and junction 607 rises to a value which is substantially equal to the value of the analogue signal applied to input terminal 601, since the potential drop across diode 603 is negligible. The signal appearing at junction 607 then is transmitted through diode 605, with substantially no distortion, to the input circuit of comparator 500.

Where a plurality of input switches of the type described above are cyclically utilized, a short period is allowed prior to each input conversion to insure that the output signal of the corresponding switch rises to the level of the associated analogue input signal. The rise of the switch output signal may, for example, be delayed due to shunt capacity across the parallel-connected switches. A set of typical waveforms illustrating by way of example the cyclical operation of a pair of input switches, during successive input conversions is shown in Fig. 6. It will be understood that the pair of input switches, for purpose of example herein referred to, comprise a first input switch and a second input switch, each input switch being identical to switch 600.

Waveforms *Ti'* and *Ad'*, shown in Fig. 6, correspond to signals *Ti* and *Ad* discussed above except that they are periodic. Waveforms 602–1 and 602–2 represent the signals applied to input terminals 602 of the first input switch and second input switch, respectively. It will be noted that waveform 602–1 becomes negative, closing the first input switch, a short interval prior to the first high-level portion of signal *Ad'*, and that waveform 602–2 becomes negative, closing the second input switch a short interval prior to the second high-level portion of signal *Ad'*; each of signals 602–1 and 602–2 then remaining negative throughout the corresponding input conversion period.

The input converter circuits of the data conversion system operate in the same manner where a plurality of analogue signals are to be converted in succession as where only one signal is converted. Thus, it is not deemed necessary to reconsider the input conversion operation which has been discussed in detail above. The discussion which follows, then, relates to the output conversion circuits and the operation thereof.

Before proceeding to consider the details of the output conversion circuits, it is convenient to consider the derivation of the defining logical equations. It will be recalled that during the output conversion operation an analogue output signal is developed in analogue output circuit 800 and is continuously compared with a reference signal representing the analogue value of the digital number to be converted. In the particular embodiment which is to be described in detail, each analogue output circuit includes a storage capacitor which is charged by a positive charging signal when the signal stored therein is less in amplitude than the reference signal produced by decoding circuit 400 and is discharged by a negative discharging signal when this signal stored therein is greater than the reference signal.

As explained above, comparator 500 continuously produces signals *Co* and $\overline{Co}$, having levels representing binary 1 and 0, respectively, when the analogue signal in the storage capacitor is less than the reference signal and having levels representing binary 0 and 1, respectively, when signal in the storage capacitor is greater than the reference signal.

During the output conversion period, then, a storage capacitor is charged by a positive charging signal when signal *Co* is 1 and is discharged by a negative discharging signal when signal $\overline{Co}$ is 1. It is possible, then, to define charging and discharging signals, designated hereinafter as *Ch* and $\overline{Dc}$, respectively, as follows:

$$Ch=Co.Da$$
$$\overline{Dc}=\overline{Co}.Da$$

where signal D*a* is produced by control circuit 700 and has a 1-representing level during each digital-to-analogue conversion period.

When a plurality of capacitors are to be charged and discharged during different digital-to-analogue conversion periods, it is necessary to add a switching signal to the above-indicated algebraic charging and discharging definitions. For this purpose an output switching signal $So^k$, produced by control circuit 700, is utilized; *k* being an integer representing the particular switching signal. Where 4 analogue output circuits are utilized, for example, *k* is any of the integers 1 through 4. With the inclusion of signal $So^k$, the charging and discharging functions then become:

$$Ch=Co.Da.So^k$$
$$\overline{Dc}=\overline{Co}.Da.So^k$$

Since the charging of the capacitors in the analogue output circuits utilizes amplifiers which invert or complement applied input signals, it is necessary to utilize signal $\overline{Ch}$, the complement of *Ch*, as an input signal to the analog output circuit to control the charging of the corresponding storage capacitor. The algebraic equation defining $\overline{Ch}$, then, is the complement of that defining *Ch*, and, in accordance with elementary principles of the Boolean logical algebra, appears as follows:

$$\overline{Ch}=\overline{Co}+\overline{Da}+\overline{So^k}$$

Similarly, it is necessary to use signal D*c*, the complement of $\overline{Dc}$, as an input signal to the analog output circuit, the equation defining $\overline{Dc}$ being the complement of that defining D*c* and appearing as follows:

$$Dc=\overline{Co}.Da.So^k$$

One form of circuit suitable for producing signals $\overline{Ch}$ and D*c* is illustrated in Fig. 3, in matrix 750 of control circuit 700. For simplicity matrix 750 is mechanized to provide only two sets of control signals for controlling the charging of two capacitors according to digital input signals, it being understood that a considerably greater number of capacitors may be charged in the same manner. Set (1) of the functions, appearing below, defines control signals $\overline{Ch^1}$ and $Dc^1$ which control the charging and discharging of a first capacitor; and set (2) defines control signals $\overline{Ch^2}$ and $Dc^2$ controlling the charging and discharging of a second capacitor. Matrix 750, then, is mechanized according to the following algebraic equations:

(1) $$\overline{Ch^1}=\overline{Co}+\overline{Da}+\overline{So^1}$$
$$Dc^1=\overline{Co}.Da.So^1$$

(2) $$\overline{Ch^2}=\overline{Co}+\overline{Da}+\overline{So^2}$$
$$Dc^2=\overline{Co}.Da.So^2$$

Since the manner in which circuits are mechanized according to logical equations has already been considered, it is not deemed necessary to consider the mechanization of matrix 750 according to the equations of sets (1) and (2) above.

Figure 8:
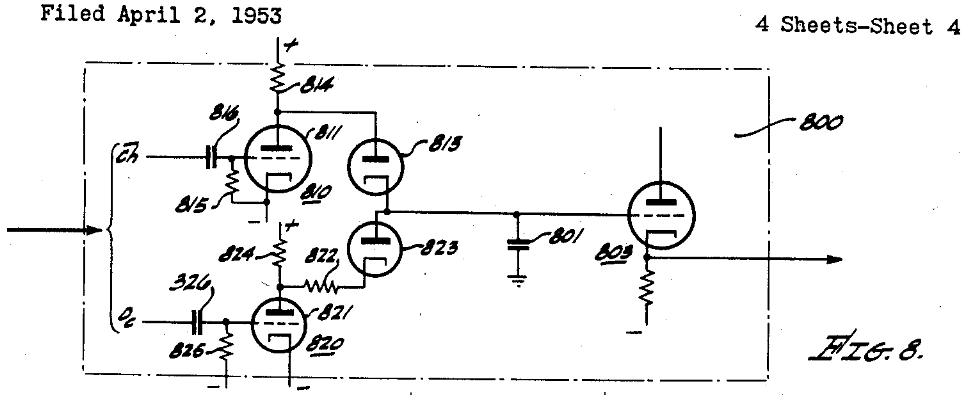
Fig. 8 is a schematic diagram of one form of the analogue output circuit shown in Fig. 1.

One form of analogue output circuit for charging and discharging a storage capacitor under the control of signals $\overline{Ch}$ and Dc is shown in Fig. 8, wherein it is noted that the output circuit comprises: a storage capacitor 801; a cathode-follower output circuit 803; a charging circuit 810, including a triode 811 and a diode 813; and a discharging circuit 820, including a triode 821 and a diode 823.

The anode of triode 811 is connected to the anode of diode 813 and is coupled through a loading resistor 814 to a source of positive potential, not shown. The grid and cathode of triode 811 are coupled together through a resistor 815, the cathode being also connected to a source of negative potential, not shown. Signal $\overline{Ch}$ is applied to the grid of triode 811 through a coupling capacitor 816 and has a 1-representing level such that triode 811 is heavily conducting when signal $\overline{Ch}=1$ and signal $Ch=0$. Under these conditions, the anode voltage of triode 811 is sufficiently negative to bias off diode 813 so that storage capacitor 801 cannot charge.

The 0-representing level of signal $\overline{Ch}$ is sufficiently negative so that the anode voltage of triode 811 is caused to rise above the highest charging potential of capacitor 801. The negative level of signal $\overline{Ch}$ may, for example be low enough to cut off triode 811. Thus, when signal $\overline{Ch}=0$, and signal $Ch=1$, diode 813 is caused to conduct and capacitor 801 charges.

Triode 821, in discharge circuit 820, has its anode coupled through current-limiting resistor 822 to the cathode of diode 823, and through load resistor 824 to a source of positive potential, not shown. The grid of triode 821 is coupled through a grid resistor 825 to a first source of negative potential; and the cathode is connected to a second source of negative potential, neither negative potential sources being shown. Signal Dc is applied to the grid of triode 821 through a coupling capacitor 826. Signal Dc, and the signals produced by the sources aplied to the anode, grid, and cathode of triode 821 are selected so that with signal Dc in a 0-representing, or low-level state, triode 821 is cut off or only slightly conducting. As a result, the anode potential of triode 821 becomes sufficiently high so as to bias off diode 823, preventing the discharge of capacitor 801. The 1-representing, or high-level state of signal Dc, is selected so that triode 821 is caused to conduct sufficiently to lower the anode potential thereof to ground potential; thus making it possible for capacitor 801 to discharge to zero potential.

It is apparent, then, that the conditions $Ch=1$ $(\overline{Ch}=0)$ and $Dc=1$, result in the charging and discharging, respectively, of capacitor 801; and that capacitor 801 is neither charged nor discharged if both of signals Ch and Dc are 0. Thus, if it is not a digital-to-analogue period ($Da=0$), or if the particular output circuit is not in operation ($So^k=0$), the corresponding capacitor is isolated from charging and discharging circuits and serves as an analogue memory. The period during which the signal produced by a capacitor reliably represents the desired analogue signal depends upon the leakage characteristic of the particular capacitor as well as the effectiveness of the diode switching circuits in the output circuit.

Figure 9:
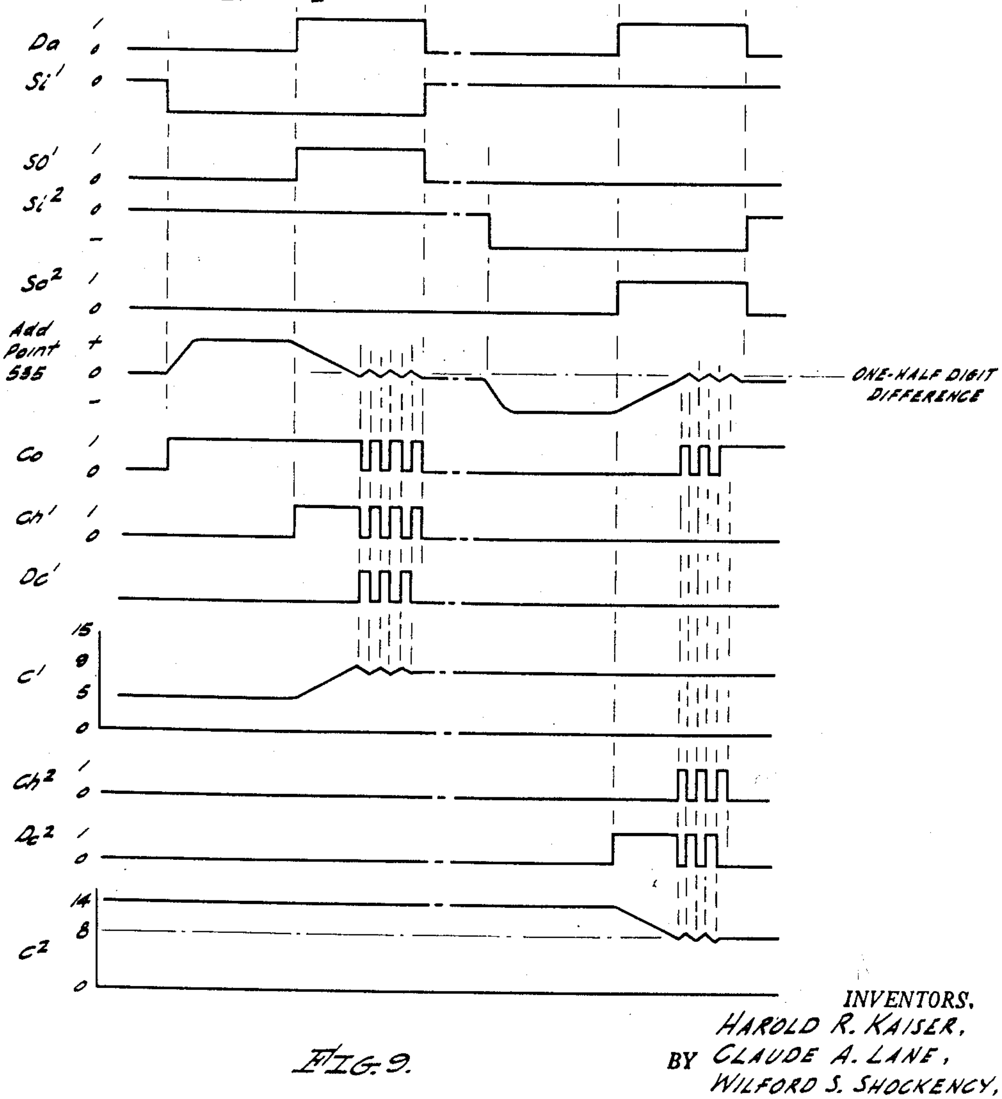
Fig. 9 is a composite diagram of the wave forms of signals appearing at various points in the embodiment of Fig. 1 during a digital-to-analogue conversion.

Consider now the operation of the system of Fig. 1 during a digital-to-analogue conversion, reference being made to Fig. 9 wherein the waveforms appearing at various points in the system of Fig. 1 during an illustrative conversion operation are shown. In the operation which is to be described, it is assumed that first and second capacitors C1 and C2, producing signals $C^1$ and $C^2$, respectively, are to be charged so that signals $C^1$ and $C^2$ finally represent the analogue equivalents of the binary numbers 1001 (9) and 1000 (8), respectively. It is also assumed that signals $C^1$ and $C^2$ are initially at levels representing the analogue equivalents of the binary numbers 0101 (5) and 1110 (14), respectively.

During the time that capacitors C1 and C2 are being charged or discharged, signals $C^1$ and $C^2$ are applied through corresponding input switches to add point 535 of comparator 500, under the control of input switching signals $Si^1$ and $Si^2$, respectively; signals $Si^1$ and $Si^2$ being produced by control circuit 700. It will be recalled that the input switching signals are negative-going signals since a negative signal is effective to close an input switch of the type shown in Fig. 7.

Referring now to Fig. 9, it will be noted that input switching signal $Si^1$ becomes negative prior to the time that output switching signal $So^1$ rises to a 1-representing level. As has been explained, this is to allow sufficient time for the application of signal $C^1$ (also shown in Fig. 9) through the corresponding input switch to add point 535 in comparator 500. During the initial period of operation, then, the potential at add point 535 rises to a level indicating the difference between reference signal produced by decoding circuit 400 and signal $C^1$. In the particular operation which is illustrated signal $C^1$ represents an analogue signal having a level (5 units) which is lower than the analogue equivalent of the desired binary number (1001) and consequently add point rises to a positive potential.

It should be noted, at this point, that the initial period described above may be utilized to shift the binary number to be converted into register 300, although a parallel type of entry is equally suitable. Where the binary number is shifted in serially during the initial period of operation, the potential at add point 535 does not rise continuously to a final positive value as shown, but will assume this final value with substantially no delay after the binary number has been shifted into register 300.

In observing waveforms Da, $So^1$ and Co of Fig. 9 it is noted that at the time that signal Da first becomes 1, signals Co and $So^1$ are 1 so that the condition $Da.Co.So^1=1$ is satisfied, and, consequently, charging signal $Ch^1$ becomes 1. As a result, capacitor C1 is continuously charged until the potential of add point 535 falls below a level corresponding to the one-half least significant binary digit biasing level discussed above. For convenience this level will be referred to hereinafter as the one-half digit level.

As soon as the add point potential falls below the one-half digit level, the comparator signal Co becomes 0 and signal $\overline{Co}$ becomes 1. Thus, the condition $Da.\overline{Co}.So^1=1$ is satisfied and signal Dc becomes 1. Capacitor C1 is then discharged until the add point potential again rises above the one-half digit level. Thereafter, capacitor C1 is alternately charged and discharged as the add point potential rises above and falls below the one-half digit level, the final value of signal C1 representing the analogue equivalent of binary 1001 within an error range which is less than the analogue equivalent of the one-half digit level.

The amount that the analogue output signals may deviate from the desired conversion signal is determined by the hysteresis characteristic of trigger circuit 540 and other delay or lag characteristics inherent in the output conversion circuits. The hysteresis characteristic of the trigger circuit is due to the difference between its "triggering-on" level and its "triggering-off" level. This effect is well known in the art and need not be considered further here. It should be noted, however, that were it possible to design a trigger circuit without a hysteresis characteristic and switching circuits which introduced no delay, the storage capacitors could be charged directly to the desired analogue value and would not be charged and discharged alternately around the desired level. As is more fully explained in copending application for "High-Speed Electronic Digital-to-Analogue Converter System," however, the hysteresis characteristic of the trigger circuit does not limit the accuracy of the output conversion unless the difference between the "triggering-on" level and "triggering-off" level of the trigger circuit is of the order of magnitude of the least significant binary digit, which in general it is not.

At the end of the first conversion operation switching signal $Si^1$ assumes a positive potential, thus opening the corresponding input switch and signal $So^1$ assumes a 0-representing level, thus preventing further charging or discharging of capacitor C1. Capacitor C1 then, will then maintain a signal representing binary 1001 for a period which depends upon its leakage characteristics and the rate of charge or discharge that may occur through the diodes in the corresponding output circuit.

The second output conversion operation is initiated as input switching signal $Si^2$ assumes a negative level and the corresponding input switch is closed. As explained above, an initial period of operation is allowed so that signal $C^2$ may be applied through a corresponding input switch to add point 535. Under the conditions assumed for the second operation add point 535 falls to a negative potential since signal $C^2$ represents an analogue signal (14) which is greater than the analogue equivalent of the binary number (1000) to be converted. When signal $Da$ becomes 1, then, the function $\overline{Co}.Da.So^2$ is equal to 1, so that signal $Dc^2$ is 1 and capacitor C2 is discharged. The discharging of capacitor of C2 continues until the potential at add point 535 becomes positive by an amount corresponding to the one-half digit level and signal $Co$ assumes a 1-representing level. From this time on, capacitor C2 is alternately charged and discharged, in the manner discussed in detail above, and finally assumes a level representing the analogue equivalent of the binary number 1000 (8) to within one-half the least significant digit.

From the foregoing description, it is apparent that the present invention provides a data conversion system which is adapted to provide both analogue-to-digital and digital-to-analogue conversions without necessitating a substantially greater amount of circuits than are required for analogue-to-digital conversion alone. The register, decoding circuit, and comparartor circuit utilized in the input conversion are also utilized in the input conversion with the result that it is only necessary to add analogue output circuits and input switches to complete an input-output system.

It should also be evident that the invention provides a high-speed electronic system for performing an input conversion without a previous digital record of prior conversions, as is required for a continuous type of converter; and that the conversion may be completed in N clock pulse intervals, where N is the number of digits in the binary number desired. As a result, the system of the present invention makes it possible to convert a considerable number of analogue signals to corresponding digital signals with simple circuits utilized on a time-sharing basis.

For simplicity the invention has been described with particularity with regard to an embodiment wherein conversions are made to and from 4-digit binary numbers. It should be understood, however, that the principles described are applicable to systems adapted to convert to and from binary numbers of other digit lengths. In a similar manner it should be apparent that the number of input and output conversions which the system has been designed to handle has been selected for illustration purposes only.

A specific form of circuit suitable for use for each of decoding circuit 400, comparator circuit 500, input switches 600, and analogue output circuits 800 has been described in detail. Other forms of circuits which may be utilized in the place of those described in detail have been incorporated into this specification by way of reference to relevant publications and therefore it should be understood that the basic concept of the invention is not dependent upon the specific circuits considered.

In a similar manner it is apparent that the circuits of control circuit 700 which are defined by the algebraic equations considered above may be replaced by others which are defined by a different set of equations. As a specific illustration, it is established in the above-mentioned copending application for "High-Speed Analogue-to-Digital Converter System," that the equations defining the connections for matrix 720 in control circuit 700 may be replaced with equations which define an input conversion wherein the flip-flops of register 300 are turned on one at a time under the control of signals produced by a timing counter.

Thus, it will be apparent to one skilled in the art that there are many data conversion systems which may be designed according to the present invention without departing from the spirit thereof.

What is claimed as new is:

1. A high-speed electronic input-output conversion system for converting a plurality of applied analogue input signals to corresponding sets of digital output signals during corresponding analogue-to-digital conversion periods, and for converting a plurality of sets of digital input signals to corresponding analogue output signals during corresponding digital-to-analogue conversion periods, said system comprising: a digital number register including a plurality of flip-flops, one for each digit of the digital signal sets, said flip-flops producing signals corresponding to said digits, respectively; a decoding circuit coupled to said register for continuously producing an analogue reference signal corresponding to the digital information in said register; a comparator circuit responsive to said reference signal and to an applied analogue signal for producing complementary signals $\overline{Co}$ and $Co$ indicating the positive and negative sense of the difference between the analogue signal and the reference signal, respectively; a plurality of analogue output circuits for producing and storing output signals corresponding to the analogue equivalent of each setting of said register, each setting of said register corresponding to a digital number to be converted; electronic switching means for applying the analogue input signals to said comparator circuit during corresponding analogue-to-digital conversion periods and for applying said analogue output signals to said comparator circuit during corresponding digital-to-analogue conversion periods; analogue-to-digital control means coupled to said register for setting said flip-flops, one at a time in descending order of place, to stable states representing the digital equivalent of the applied analogue signal, said analogue-to-digital control means including first means for initially setting said flip-flops to one stable state, second means for sequentially setting said flip-flops to the other stable state, and third means operable in response to one of said complementary signals for resetting said flip-flops to said one state after said flip-flops are set to other state, respectively; and digital-to-analogue control means coupled between said analogue output circuits and said comparator circuit for actuating said output circuits to produce said analogue output signals, said digital-to-analogue control means including means responsive to signals $Co$ and $\overline{Co}$, respectively, for selectively actuating said output circuits to increase and decrease the level of the corresponding output signal until said corresponding output signal becomes equal to said reference signal.

2. The system defined in claim 1 wherein said one and other stable states are the 0 and 1 representing stable states, respectively, of said flip-flops, and said one complementary signal is signal $Co$; and wherein said analogue-to-digital control means includes a plurality of "and" and "or" circuits mechanized according to a predetermined set of logical equations defining an analogue-to-digital conversion wherein said flip-flops are initially set to 0-representing stable states, and are then set to 1-representing stable states in descending sequence, the flip-flops being reset to 0-representing stable states in response to signal $Co$.

3. The system defined in claim 1 wherein each of said analogue output circuits includes a storage capacitor for producing the corresponding analogue output signal, and charging and discharging circuits coupled to said storage capacitor; and wherein said digital-to-analogue control means includes means for producing a charging signal C*h* and a discharging signal D*c* for each of said analogue output circuits, and signal generating means for producing switch-out signals S*o* for selectively actuating said analogue output circuits; said charging circuits being responsive to the corresponding signal C*h* and S*o* to increase the level of the output signal stored in said capacitor, and said discharging circuits being responsive to the corresponding signal D*c* and signal S*o* to decrease the level of the output signal stored in said capacitor.

References Cited in the file of this patent

UNITED STATES PATENTS

| | | |
|---|---|---|
| 2,451,044 | Pierce | Oct. 12, 1948 |
| 2,607,006 | Hoeppner | Aug. 12, 1952 |
| 2,616,965 | Hoeppner | Nov. 4, 1952 |

OTHER REFERENCES

The Binary Quartizer, Electrical Engineering, vol. 68, No. 11, pages 962–967; November 1949.